(12) United States Patent
Tochio et al.

(10) Patent No.: US 10,347,431 B2
(45) Date of Patent: Jul. 9, 2019

(54) SOLID ELECTROLYTIC CAPACITOR WITH POROUS SINTERED BODY AS AN ANODE BODY AND MANUFACTURING THEREOF

(71) Applicant: Panasonic Intellectual Property Management Co., Ltd., Osaka (JP)

(72) Inventors: Takaya Tochio, Osaka (JP); Yasuhiko Kishinaga, Osaka (JP); Takuya Yamashita, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 94 days.

(21) Appl. No.: 15/667,400

(22) Filed: Aug. 2, 2017

(65) Prior Publication Data
US 2017/0330692 A1 Nov. 16, 2017

Related U.S. Application Data

(63) Continuation of application No. PCT/JP2016/000949, filed on Feb. 23, 2016.

(30) Foreign Application Priority Data

Feb. 27, 2015 (JP) .................. 2015-039176

(51) Int. Cl.
*H01G 9/052* (2006.01)
*H01G 9/15* (2006.01)
*H01G 9/012* (2006.01)

(52) U.S. Cl.
CPC ............. *H01G 9/052* (2013.01); *H01G 9/012* (2013.01); *H01G 9/15* (2013.01)

(58) Field of Classification Search
CPC combination set(s) only.
See application file for complete search history.

(56) References Cited

U.S. PATENT DOCUMENTS

| 3,818,286 A * | 6/1974 | Ganz | ...................... H01G 9/052 361/529 |
| 5,486,977 A * | 1/1996 | Hasegawa | ................ H01G 9/15 361/523 |

(Continued)

FOREIGN PATENT DOCUMENTS

| JP | 10233347 A | * | 9/1998 |
| JP | 2006080266 A | * | 3/2006 |

(Continued)

OTHER PUBLICATIONS

The Reason for Submission dated Aug. 9, 2017 for the related Japanese Patent Application No. JP2017-501934.

(Continued)

*Primary Examiner* — David M Sinclair
(74) *Attorney, Agent, or Firm* — McDermott Will & Emery LLP

(57) ABSTRACT

A solid electrolytic capacitor includes a capacitor element having an anode body that is a porous sintered body having a hexahedral shape, an anode lead, a dielectric layer, and a solid electrolyte layer. One end of the anode lead is embedded into the anode body from a first surface of the anode body. The anode body includes a second surface and a third surface which are opposite to each other. The anode body has a first region including the second surface, a second region including the third surface, and a third region interposed between the first region and the second region. The third region has lower density than each of the first region and the second region. An average thickness T3 of the third region and a thickness TL of the anode lead satisfy a relationship T3<TL. A surface of the anode lead is in contact with at least one of the first region and the second region.

13 Claims, 2 Drawing Sheets

(56) References Cited

U.S. PATENT DOCUMENTS

| | | | | |
|---|---|---|---|---|
| 6,351,371 B1* | 2/2002 | Yoshida | ................. | H01G 9/052 361/508 |
| 2008/0106853 A1* | 5/2008 | Suenaga | ............ | B01D 39/2034 361/529 |
| 2009/0279233 A1* | 11/2009 | Freeman | ................... | B22F 7/08 361/529 |
| 2013/0321985 A1* | 12/2013 | Djebara | ................. | H01G 9/012 361/528 |

FOREIGN PATENT DOCUMENTS

| | | |
|---|---|---|
| JP | 2010-153625 | 7/2010 |
| JP | 2010-165701 | 7/2010 |

OTHER PUBLICATIONS

International Search Report of PCT application No. PCT/JP2016/000949 dated May 10, 2016.

\* cited by examiner

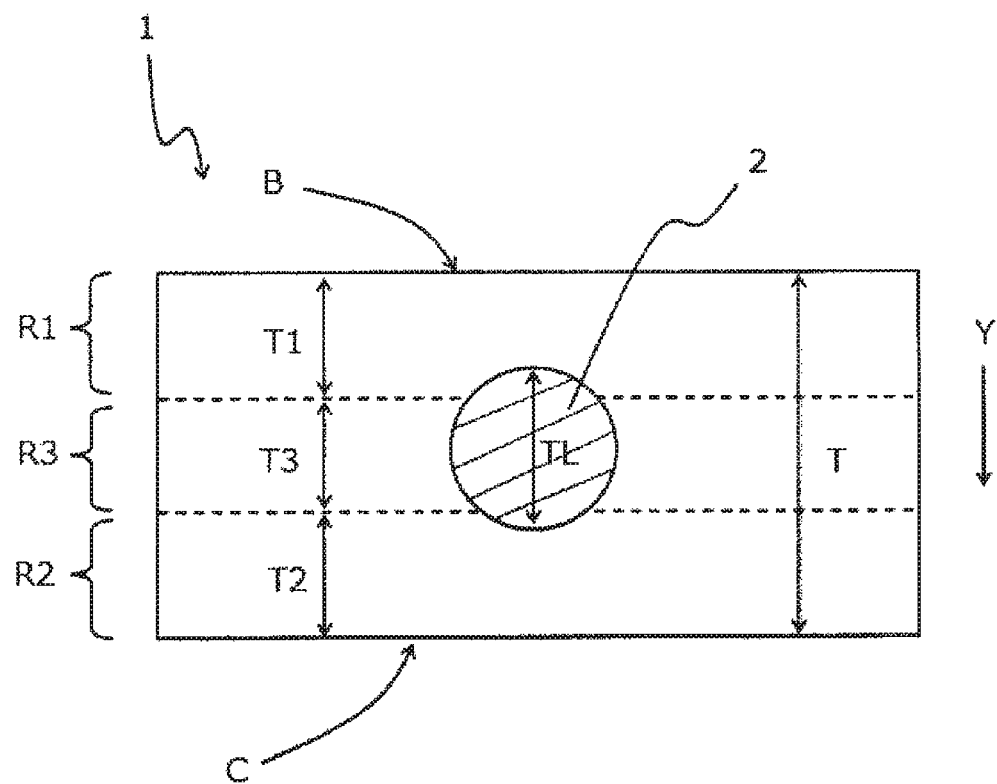

SOLID ELECTROLYTIC CAPACITOR WITH POROUS SINTERED BODY AS AN ANODE BODY AND MANUFACTURING THEREOF

RELATED APPLICATIONS

This application is a continuation of the PCT international Application No. PCT/JP2016/000949, filed on Feb. 23, 2016, which claims the benefit of foreign priority of Japanese patent application No. 2015-039176, filed on Feb. 27, 2015, the contents all of which are incorporated herein by reference.

TECHNICAL FIELD

The present disclosure relates to a solid electrolytic capacitor and, in detail, relates to a solid electrolytic capacitor including a porous sintered body as an anode.

BACKGROUND

Recently, a small-sized and high-capacitance capacitor used for high frequency applications has been desired along with downsizing and lightening of electronic devices. As such a capacitor, a solid electrolytic capacitor having low equivalent series resistance (ESR) and excellent frequency characteristics has been developed. The solid electrolytic capacitor includes an anode body, a dielectric layer formed on a surface of the anode body, and a solid electrolyte layer formed on a surface of the dielectric layer. As the anode body, there can be used a porous sintered body obtained by sintering particles of a valve metal such as tantalum, niobium, or titanium.

The porous sintered body is usually produced by subjecting valve metal particles to pressing, followed by sintering. In the production, when a density of valve metal particles is too increased in the sintered body, an impregnation property of the sintered body deteriorates with respect to a raw material liquid for forming a solid electrolyte layer. Therefore, it becomes sometimes difficult to form a sufficient solid electrolyte layer on the surface of the dielectric layer.

In order to solve such a problem, Unexamined Japanese Patent Publication No. 2010-165701 discloses an anode body including a first sintered body having low density and a second sintered body having higher density than the first sintered body is used, the second sintered body disposing around the first sintered body. Further, in Unexamined Japanese Patent Publication No. 2010-153625, a sintered body is sandwiched between higher-density sintered bodies to improve bending strength and strength at a corner of an anode body.

SUMMARY

A solid electrolytic capacitor according to the present disclosure includes a capacitor element that has an anode body being a porous sintered body having hexahedral shape, an anode lead, a dielectric layer formed on the anode body, and a solid electrolyte layer formed on the dielectric layer. One end of the anode lead is embedded into the anode body from a first surface of the anode body. The anode body has a second surface and a third surface which are opposite to each other and are respectively sharing one side with the first surface, the anode body having a first region that includes the second surface, a second region that includes the third surface, and a third region interposed between the first region and the second region. The third region has lower density than each of the first region and the second region. An average thickness T3 of the third region in a first direction extending from the second surface to the third surface and a thickness TL of the anode lead in the first direction satisfy a relationship T3<TL. A surface of the anode lead is in contact with at least one of the first region and the second region.

According to the present disclosure, there can be obtained a solid electrolytic capacitor having large capacitance and low leakage current.

BRIEF DESCRIPTION OF DRAWINGS

FIG. 3 is a top view illustrating the anode body and the anode lead in FIG. 2 viewed from a surface A side.

DESCRIPTION OF EMBODIMENT

Prior to describing an exemplary embodiment of the present invention, problems in a conventional technique will briefly be described. An anode lead is connected to an anode body. When a porous sintered body is used as an anode body, one end of the anode lead is embedded in the anode body. As in Unexamined Japanese Patent Publication No. 2010-165701 and Unexamined Japanese Patent Publication No. 2010-153625, when one end of an anode lead is embedded in a part of an anode body that is low in density, the anode lead is not sometimes sufficiently fixed. When the anode lead embedded easily moves, a crack is likely to be generated in the sintered body from around the anode lead, so that leakage current sometimes increases.

Figure 1:
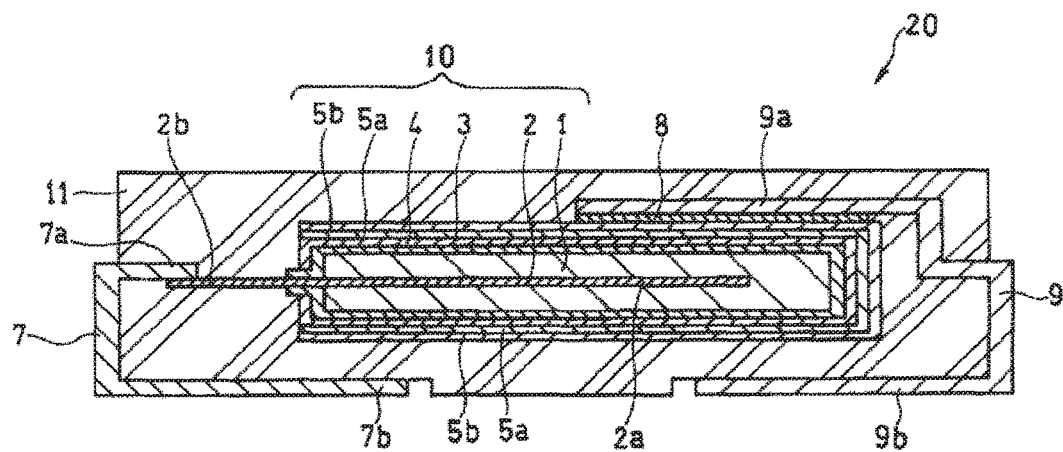
FIG. 1 is a schematic sectional view illustrating a solid electrolytic capacitor according to one exemplary embodiment of the present disclosure.

A solid electrolytic capacitor according to one exemplary embodiment of the present disclosure is described with reference to FIG. 1. FIG. 1 is a schematic sectional view illustrating solid electrolytic capacitor 20 according to the present exemplary embodiment.

<Solid Electrolytic Capacitor>

Solid electrolytic capacitor 20 includes capacitor element 10 having a hexahedral outer shape, resin outer packing 11 that encapsulates capacitor element 10, and anode terminal 7 and cathode terminal 9 that are each exposed to an exterior of resin outer packing 11. Solid electrolytic capacitor 20 has a nearly hexahedral outer shape as in capacitor element 10.

Capacitor element 10 includes anode body 1 that is a porous sintered body having a hexahedral shape, anode lead 2, dielectric layer 3 formed on anode body 1, and solid electrolyte layer 4 formed on dielectric layer 3. Capacitor element 10 further includes cathode layer 5 (5a, 5b) that covers a surface of solid electrolyte layer 4.

First portion 2a including one end of anode lead 2 is embedded into anode body 1 from one surface (surface A) of anode body 1. Second portion 2b including the other end of anode lead 2 is electrically connected, by welding or the like, to first portion 7a of anode terminal 7 which is encapsulated in resin outer packing 11. On the other hand, cathode layer 5 is electrically connected to first portion 9a of cathode terminal 9 which is encapsulated in resin outer packing 11, with conductive adhesive material 8 (e.g. a mixture of a thermosetting resin with metal particles) interposed between cathode layer 5 and first portion 9a. Second portion 7b of anode terminal 7 and second portion 9b of cathode terminal 9 are respectively drawn out from different side surfaces of resin outer packing 11, and each extend to one main flat surface (lower surface in FIG. 1) in an exposed state. The exposed parts of the terminals on the main flat surface are used for, for example, solder connection to a substrate (not shown in the drawings) on which solid electrolytic capacitor 20 is to be mounted.

Figure 2:
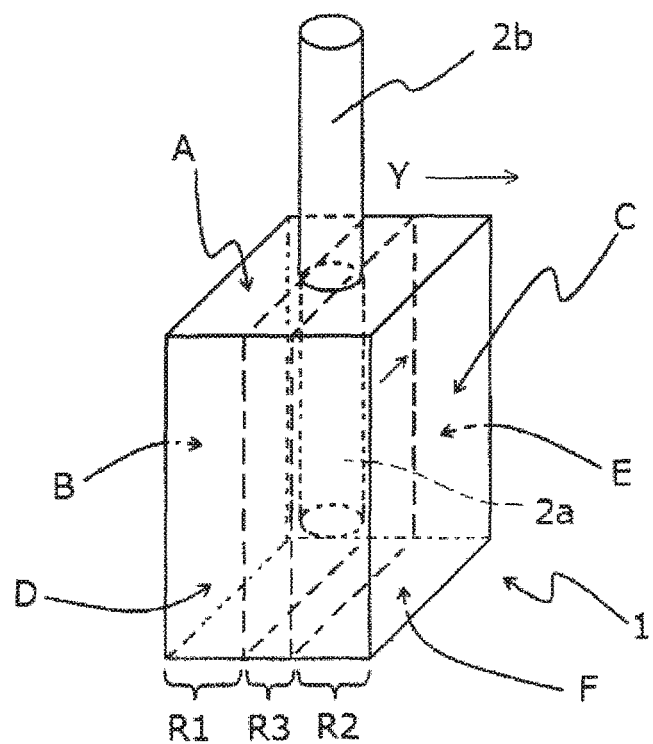
FIG. 2 is a perspective view illustrating an anode body and an anode lead according to one exemplary embodiment of the present disclosure.

A capacitor element according to the present exemplary embodiment is described in detail with reference to FIGS. 2 and 3. FIG. 2 is a perspective view illustrating an anode member (an anode body and an anode lead) according to one exemplary embodiment of the present disclosure. FIG. 3 is a top view illustrating the anode member in FIG. 2 viewed from a surface A side.

<Anode Member>

Anode body 1 is a porous sintered body obtained by sintering valve metal particles. Anode lead 2 is formed of, for example, a wire having electric conductivity. The anode member is manufactured by, for example, embedding first portion 2a of anode lead 2 in particles of a valve metal or an alloy including a valve metal and then pressing the metal particles into a hexahedron while first portion 2a is embedded in the metal particles, followed by sintering. With this process, second portion 2b of anode lead 2 is drawn out so as to stand up from one surface (surface A) of anode body 1.

Anode body 1 obtained as described above includes four surfaces (surfaces B to E) that each share one different side with the surface A, and a surface F opposite to the surface A. In FIG. 2, each of the surfaces B to E is orthogonal to the surface A, but is not limited to this configuration. For example, an angle formed between each of the surfaces B to E and the surface A may approximately range from 75° to 110°, inclusive. In addition, second portion 2b of anode lead 2 stands up perpendicularly to the surface A in FIG. 2, but is not limited to this configuration. For example, an angle formed between a perpendicular line to the surface A and second portion 2b may approximately range from 0° to 20°, inclusive.

Anode body 1 has first region R1 including the surface B, second region R2 including the surface C opposite to the surface B, and third region R3 interposed between first region R1 and second region R2. Third region R3 is a region having lower density than first region R1 and second region R2. The density refers to a mass per unit volume. In anode body 1, a difference in density can also be said as, for example, a difference in porosity (void level). The difference in porosity can be perceived by, for example, a difference in Vickers hardness.

That is, a Vickers hardness H3 of third region R3 is lower than each of a Vickers hardness H1 of first region R1 and a Vickers hardness H2 of second region R2 (H1, H2>H3). Particularly, a relationship among the regions R1, R2, and R3 in Vickers hardness is preferably H1, H2>1.1×H3. When the Vickers hardness H3 is in this range, third region R3 has a sufficiently high porosity. In this case, an impregnation property of a raw material liquid for forming the solid electrolyte layer into the anode body can be improved to sufficiently form the solid electrolyte layer on a surface of the dielectric layer. The Vickers hardness H3 preferably ranges from 1 to 100, inclusive.

A Vickers hardness H can be measured in accordance with JIS Z 2244. For a small load, a testing machine is preferably used that corresponds to a micro-Vickers hardness test. The Vickers hardness H can be measured under conditions of, for example, a load ranging from 3 N to 10 N, inclusive, and a test force holding time ranging from 10 s to 20 s, inclusive.

The densities (or Vickers hardnesses) of first region R1 and second region R2 may be the same or different.

First region R1, second region R2, and third region R3 can be observed visually or by a microscope. Two boundary surfaces that are almost parallel with the surface B (or the surface C) are formed between the surface B and the surface C. A region sandwiched between the boundary surfaces is third region R3. When the boundary surfaces are not clear, an image of the surface D (or the surface E) taken by a microscope may be subjected to binarization to determine each region. In this case, third region R3 having lower density is displayed darker than the other regions.

An average thickness T3 of third region R3 in a Y-direction extending from the surface B to the surface C and a thickness TL of anode lead 2 in the Y-direction satisfy a relationship T3<TL. When anode body 1 is manufactured by the method described above, third region R3 having low density is usually formed around first portion 2a in a direction almost parallel with the surface B (or the surface C). Therefore, when T3 and TL satisfy the relationship T3<TL, first portion 2a is disposed so as to straddle between third region R3 and at least one of first region R1 and second region R2.

In other words, a surface of first portion 2a is in contact with at least one of first region R1 and second region R2 each which has higher density. With this configuration, anode lead 2 is strongly fixed to anode body 1. On the other hand, when T3 and TL satisfy a relationship T3≥TL, first portion 2a is entirely disposed in third region R3 having low density, so that the anode lead is not sufficiently fixed. The surface of first portion 2a is preferably in contact with both first region R1 and second region R2 in order to further strongly fix anode lead 2.

A ratio TL/T3 between the average thickness T3 and the thickness TL preferably ranges from 1.1 to 4.0, inclusive. When the ratio TL/T3 is in this range, an area of the surface of first portion 2a which is in contact with at least one of first region R1 and second region R2 is increased so that anode lead 2 is further strongly fixed to anode body 1. Further, in such a configuration, valve metal particles are likely to be molded by pressing.

The Y-direction is a direction parallel with a straight line connecting the surface B to the surface C in a shortest distance. The average thickness T3 of third region R3 can be acquired by averaging, on the surface A of anode body 1, lengths of three straight lines each which is in parallel with the Y-direction, the three straight lines being extending from any three points on one surface of third region R3 which is parallel with the surface B to the other surface of third region R3. An average thickness T of anode body 1, an average thickness T1 of first region R1, and an average thickness T2 of second region R2 in the Y-direction are also similarly acquired.

The average thickness T3 and the average thickness T of anode body 1 in the Y-direction preferably satisfy a relationship 0.15<T3/T<0.4. When the ratio T3/T is in this range, the impregnation property of a raw material liquid for forming solid electrolyte layer 4 into anode body 1 further improves, and strength of anode body 1 can be secured.

The thickness TL and the average thickness T preferably satisfy a relationship TL/T≤0.8. When the ratio TL/T is in this range, valve metal particles are likely to be molded by pressing.

Each of an area Sb of the surface B and an area Sc of the surface C is preferably larger than each of an area Sd of the surface D and an area Se of the surface E (Sb, Sc>Sd, Se). In such a configuration, an area of a surface of each of first region R1 and second region R2, which faces to third region R3, can be increased so that anode lead 2 can be further strongly fixed to anode body 1. Each of the area Sb and the area Sc is preferably two times to four times, inclusive, the area Sd or the area Se. The area Sb and the area Sc may be the same or different. In terms of facilitating production of the solid electrolytic capacitor, however, the area Sb and the area Sc are preferably the same. The area Sd and the area Se may be the same of different, but are preferably the same, similarly.

A proportion of first portion 2a to anode lead 2, i.e., a proportion of an embedded portion to anode lead 2 is not particularly limited.

As a material that constitutes anode body 1, there can be used one of valve metals such as titanium (Ti), tantalum (Ta), and niobium (Nb), or two or more thereof in combination. As a conductive material that constitutes anode lead 2, the valve metals described above can also be exemplified. The material that constitutes anode body 1 and the material that constitutes anode lead 2 may be the same kind or different kinds. An oxide of a valve metal has a high dielectric constant and is therefore suitable as a constituent material of the anode member. The materials may also be an alloy made of two or more metals. For example, there can be used an alloy including a valve metal and silicon, vanadium, boron, or the like. Alternatively, a compound including a valve metal and a typical element such as nitrogen may also be used. The alloy of a valve metal includes the valve metal as a main component and preferably includes the valve metal in an amount of 50 atom % or more.

An average particle diameter D50 of primary particles of valve metal particles preferably ranges from 0.05 μm to 0.5 μm, inclusive, for example. Here, the average particle diameter D50 is a median diameter in a volume particle size distribution obtained by a laser diffraction particle size distribution measuring apparatus (the same applies hereinafter).

A CV value of the anode body is preferably 100 kCV/g or more. The CV value is represented by a product of a formation voltage and electrostatic capacity of an anode body, the formation voltage being a voltage during a anodizing treatment and the electrostatic capacity being measured at a frequency of 120 Hz after the anode body is subjected to the anodizing treatment in an aqueous solution of 0.02 mass % phosphoric acid for 2 hours under conditions of a formation voltage of 10 V and a temperature of 60° C. Particularly, the CV value is more preferably 105 kCV/g or more from the viewpoint of capacitance.

<Dielectric Layer>

Dielectric layer 3 can be formed as an oxide film by oxidizing a surface of a conductive material that constitutes anode body 1. Accordingly, dielectric layer 3 is uniformly formed along a surface (including inner wall surfaces of pores) of a porous sintered body that constitutes anode body 1. Dielectric layer 3 has a thickness ranging, for example, from 10 nm to 200 nm, inclusive.

<Solid Electrolyte Layer>

Solid electrolyte layer 4 is formed so as to cover at least a part of an upper surface of dielectric layer 3. As a solid electrolyte, there can be exemplified manganese dioxide and a conductive polymer. Especially, a conductive polymer is preferable because the conductive polymer is high in electric conductivity to further reduce ESR. Solid electrolyte layer 4 has a thickness ranging, for example, from 1 μm to 50 μm, inclusive.

Solid electrolyte layer 4 including a conductive polymer can be formed through, for example, chemical polymerization and/or electrolytic polymerization of a raw material monomer on dielectric layer 3. Alternatively, solid electrolyte layer 4 including a conductive polymer can be formed by coating dielectric layer 3 with a solution in which the conductive polymer is dissolved or a dispersion liquid in which the conductive polymer is dispersed. As a solvent or a dispersion medium, for example, water can be used.

Examples of the conductive polymer include polypyrrole, polythiophene, polyfuran, polyaniline, polyacetylene, polyphenylene, polyparaphenylene vinylene, polyacene, polythiophene vinylene, polyfluorene, polyvinylcarbazole, polyvinylphenol, polypyridine, and derivatives of these polymers. One of these polymers and derivatives may be used alone, or a plurality of polymers and/or derivatives may be used in combination. Alternatively, the conductive polymer may be a copolymer of two or more kinds of monomers. Among the conductive polymers, for example, polythiophene, polyaniline, and polypyrrole are preferable for their excellent electric conductivity.

In the present specification, polypyrrole, polythiophene, polyfuran, polyaniline, and the like mean a polymer having, as a basic skeleton, polypyrrole, polythiophene, polyfuran, polyaniline, and the like, respectively. Therefore, polypyrrole, polythiophene, polyfuran, polyaniline, and the like also include derivatives of polypyrrole, polythiophene, polyfuran, polyaniline, and the like, respectively. For example, polythiophene includes poly(3,4-ethylenedioxythiophene) and the like.

To a polymerization liquid for forming a conductive polymer, or a conductive polymer solution or dispersion liquid, various dopants may be added to improve the electric conductivity of the conductive polymer. The dopant is not particularly limited, and examples of the dopant include 1,5-naphthalenedisulfonic acid, 1,6-naphthalenedisulfonic acid, 1-octanesulfonic acid, 1-naphthalenesulfonic acid, 2-naphthalenesulfonic acid, 2,6-naphthalenedisulfonic acid, 2,7-naphthalenedisulfonic acid, 2-methyl-5-isopropylbenzenesulfonic acid, 4-octylbenzenesulfonic acid, 4-nitrotoluene-2-sulfonic acid, m-nitrobenzenesulfonic acid, n-octylsulfonic acid, n-butanesulfonic acid, n-hexanesulfonic acid, o-nitrobenzenesulfonic acid, p-ethylbenzenesulfonic acid, trifluoromethanesulfonic acid, hydroxybenzenesulfonic acid, butylnaphthalenesulfonic acid, benzenesulfonic acid, polystyrenesulfonic acid, polyvinylsulfonic acid, methanesulfonic acid, and derivatives of these acids. Examples of the derivatives include metal salts such as a lithium salt, a potassium salt, and a sodium salt, ammonium salts such as a methylammonium salt, a dimethylammonium salt, and a trimethylammonium salt, a piperidium salt, a pyrrolidium salt, and a pyrrolinium salt.

When the conductive polymer in a state of particles is dispersed in a dispersion medium, the particles preferably have an average particle diameter D50 ranging, for example, from 0.01 μm to 0.5 μm, inclusive. When the particles have an average particle diameter D50 in this range, the particles can easily penetrate into third region R3 of anode body 1, and solid electrolyte layer 4 can also be formed on surfaces of pores formed in third region R3.

<Cathode Layer>

Cathode layer 5 includes carbon layer 5a and metal (e.g., silver) paste layer 5b formed on a surface of carbon layer 5a. Carbon layer 5a is formed so as to cover at least a part of an upper surface of solid electrolyte layer 4. Carbon layer 5a is formed of a composition including a conductive carbon material such as graphite. Metal paste layer 5b is formed of, for example, a composition including silver particles and a resin. A configuration of cathode layer 5 is not limited to this example, and it is sufficient if the cathode layer has an electricity collecting function.

As described above, anode body 1 and anode lead 2 constitute the anode member of capacitor element 10, solid electrolyte layer 4 and cathode layer 5 constitute a cathode member of capacitor element 10, and dielectric layer 3 constitutes a dielectric member of capacitor element 10.

One example of a method for producing the solid electrolytic capacitor according to the present exemplary embodiment is described.

<<Method for Producing Solid Electrolytic Capacitor>>

(1) Step of Manufacturing Anode Member

Particles of a valve metal and anode lead 2 are put in a die so that first portion 2a is embedded in the valve metal particles, they are molded by pressing, and then sintered in a vacuum to manufacture an anode member in which first portion 2a is embedded into a porous sintered body from a surface A of the porous sintered body.

Specifically, a die of a press machine that is surrounded by six surfaces is filled with the valve metal particles, first portion 2a is then inserted, and then a load is applied to a surface into which first portion 2a is inserted and a surface opposite to the surface so as to form the surface A and a surface F opposite to the surface A. Next, a load is applied to two surfaces that each share one side with the surface A and are opposite to each other, so as to form a surface D and a surface E. Last, the other two surfaces that each share one side with the surface A are pressed so as to form a surface B and a surface C. The surface B and the surface C are formed with a pressure larger than a pressure for forming the other surfaces so as to form third region R3, which has low density, around first portion 2a in a direction almost parallel with the surface B and the surface C.

The pressure for pressing is not particularly limited and ranges, for example, from around 10 N to around 100 N, inclusive. The valve metal particles may be mixed with a binder such as polyacrylic carbonate or camphor ($C_{10}H_{16}O$) as necessary.

(2) Step of Forming Dielectric Layer on Anode Body

Dielectric layer 3 is formed on anode body 1. Specifically, anode body 1 is immersed in an electrolytic aqueous solution (e.g., phosphoric acid aqueous solution) filling an anodization tank and second portion 2b of anode lead 2 is connected to the anode body in the anodization tank to perform anodization, so that dielectric layer 3 formed of an oxide film of the valve metal can be formed on a surface of anode body 1. As the electrolytic aqueous solution, not only the phosphoric acid aqueous solution but also, for example, nitric acid, acetic acid, and sulfuric acid can be used.

(3) Step of Forming Solid Electrolyte Layer

In the present exemplary embodiment, a step of forming solid electrolyte layer 4 including a conductive polymer is described. Solid electrolyte layer 4 including a conductive polymer is formed, for example, by a method for impregnating anode body 1, on which dielectric layer 3 has been formed, with a monomer or a oligomer, and then polymerizing the monomer or the oligomer through chemical polymerization or electrolytic polymerization, or by impregnating anode body 1, on which dielectric layer 3 has been formed, with a conductive polymer solution or dispersion liquid, and then drying the solution or liquid to form the solid electrolyte layer on at least a part of dielectric layer 3.

Further, a solid electrolyte layer (second solid electrolyte layer) including a second conductive polymer may be formed on top of solid electrolyte layer 4. The second solid electrolyte layer can be electrochemically formed through, for example, electrolytic polymerization. The electrolytic polymerization is suitable for synthesis of a thin film-shaped polymer. Alternatively, the second solid electrolyte layer can be formed on at least a part of the first solid electrolyte layer by coating the first solid electrolyte layer with a conductive polymer solution or dispersion liquid, and then drying the solution or liquid.

(4) Step of Forming Cathode Layer

Cathode layer 5 formed of carbon layer 5a and silver paste layer 5b can be formed by coating a surface of solid electrolyte layer 4 with a carbon paste and a silver paste in this order. A configuration of cathode layer 5 is not limited to this example, and it is sufficient if the cathode layer has a function of power collection.

EXAMPLES

Hereinafter, the present disclosure is described in more detail with reference to examples. The present disclosure, however, is not limited to the examples.

Example 1

An electrolytic capacitor was manufactured in the following manner.

<Step 1: Formation of Anode Body 1>

As a valve metal, tantalum metal particles whose primary particles had an average particle diameter D50 of about 0.1 μm and whose secondary particles had an average particle diameter of about 0.2 μm were used. The tantalum metal particles were formed into a rectangular parallelepiped by the method described above so that first portion 2a of anode lead 2 made of tantalum was embedded into the tantalum metal particles, and then a resultant compact was sintered in a vacuum.

According to this process, an anode member including anode body and anode lead 2 was obtained. Anode body 1 was formed of a tantalum porous sintered body. Anode lead 2 included first portion 2a embedded in anode body 1 and the other portion (second portion 2b) stood up from one surface (surface A) of anode body 1. Anode body 1 had a rectangular parallelepiped shape having an average length of 2.0 mm between the surface A and a surface F opposite to the surface A, an average length of 1.0 mm between a surface B orthogonal to the surface A and a surface C opposite to the surface B, and an average length of 2.5 mm between a surface D and a surface E that are orthogonal to the surface A and are other than the surface B and the surface C. That is, the average thickness T was 1.0 mm. Second portion 2b of anode lead 2 stood up from the surface A of anode body 1 forming an angle of 0° with respect to a perpendicular line to the surface A.

It was observed by a microscope that resultant anode body 1 had two boundary surfaces almost parallel with the surface B. With a region sandwiched between the boundary surfaces defined as third region R3, the average thickness T3 (0.28 mm) was calculated. A region including the surface B was defined as first region R1, and a region including the surface C was defined as second region R2. The thickness TL of anode lead 2 on the surface A was 0.4 mm as a result of measurement. In addition, a center of the third region nearly overlapped a center of a sectional area of anode lead 2.

When the anode member was viewed from the surface A side, the sectional area of anode lead 2 straddled first region R1, second region R2, and third region R3, and a surface of first portion 2a was in contact with each of first region R1, second region R2, and third region R3. The average thicknesses of first region R1 and second region R2 were both 0.36 mm. The Vickers hardness H1 of the first region and the Vickers hardness H2 of the second region were both 1.1 times or more the Vickers hardness H3 of the third region.

<Step 2: Formation of Dielectric Layer 3>

Anode body 1 and one portion of anode lead 2 were immersed in an electrolytic aqueous solution, or a phosphoric acid aqueous solution filling a anodization tank and second portion 2b of anode lead 2 was connected to the anode body in the anodization tank. Then, anodization was performed to form uniform dielectric layer 3 of tantalum oxide ($Ta_2O_5$) on a surface of anode body 1 (a surface of a porous sintered body including inner wall surfaces of pores) and a surface of the portion of anode lead 2. The anodization was performed by immersing anode body 1 in an aqueous solution of 0.02 mass % phosphoric acid for 2 hours under conditions of a formation voltage of 10 V and a temperature of 60° C. A CV value of the anode body after the anodization was 100 kCV/g or more.

<Step 3: Formation of Solid Electrolyte Layer 4>

A mixed solution was prepared by dissolving 3,4-ethylenedioxythiophene and a dopant, or polystyrenesulfonic acid in ion-exchanged water. While the resultant mixed solution was stirred, ferric sulfate and sodium persulfate that were dissolved in ion-exchanged water was added to the mixed solution to cause a polymerization reaction. After the reaction, a resultant reaction solution was dialyzed to remove unreacted monomers and an excessive oxidant, so that a dispersion liquid was obtained that included about 3.0 mass % of polyethylene dioxythiophene doped with polystyrenesulfonic acid. The anode body on which dielectric layer 3 had been formed was impregnated with the resultant dispersion liquid for 5 minutes and dried at 150° C. for 30 minutes to form solid electrolyte layer 4 on dielectric layer 3.

<Step 6: Formation of Cathode Layer 5>

A surface of solid electrolyte layer 4 was coated with a carbon paste to form carbon layer 5a. Next, a surface of carbon layer 5a was coated with a silver paste to form silver paste layer 5b. Thus, cathode layer 5 was formed that was formed of carbon layer 5a and silver paste layer 5b.

<Step 7: Manufacture of Solid Electrolytic Capacitor>

A resultant capacitor element was encapsulated to complete a solid electrolytic capacitor of Example 1 that is illustrated in FIG. 1 and then the following evaluation was conducted. Table 1 shows results of the evaluation.

[Evaluation]

<<Electrostatic Capacity>>

Electrostatic capacity was measured at a frequency of 120 Hz with an LCR meter.

<<Leakage Current>>

A voltage of 6.3 V was applied between the anode body and the cathode, and leakage current (LC40) was measured after 40 seconds of the application.

Example 2

A solid electrolytic capacitor was obtained in the same manner as in Example 1 except that the pressing was performed so as to make the average thickness T3 of third region R3 0.35 mm, and the evaluation was conducted. Table 1 shows results of the evaluation. A surface of first portion 2a was in contact with each of first region R1, second region R2, and third region R3. The Vickers hardness H1 of the first region and the Vickers hardness H2 of the second region were both 1.1 times or more the Vickers hardness H3 of the third region. A CV value of the anode body after anodization was 100 kCV/g or more.

Example 3

A solid electrolytic capacitor was obtained in the same manner as in Example 1 except that the pressing was performed so as to make the average thickness T3 of third region R3 0.19 mm, and the evaluation was conducted. Table 1 shows results of the evaluation. A surface of first portion 2a was in contact with each of first region R1, second region R2, and third region R3. The Vickers hardness H1 of the first region and the Vickers hardness H2 of the second region were both 1.1 times or more the Vickers hardness H3 of the third region. A CV value of the anode body after anodization was 100 kCV/g or more.

Comparative Example 1

A solid electrolytic capacitor was obtained in the same manner as in Example 1 except that the pressing was performed so as to make the average thickness T3 of third region R3 0.43 mm, and the evaluation was conducted. Table 1 shows results of the evaluation. A surface of first portion 2a was in contact with only third region R3. A CV value of the anode body after anodization was 100 kCV/g or more.

Comparative Example 2

A solid electrolytic capacitor was obtained in the same manner as in Example 1 except that the pressing was performed so as to make the average thickness T3 of third region R3 almost 0 mm, and the evaluation was conducted. Table 1 shows results of the evaluation. A CV value of the anode body after anodization was smaller than 100 kCV/g.

TABLE 1

|  | T3 (mm) | Electrostatic capacity (μF) | LC40 (μA) |
| --- | --- | --- | --- |
| Example 1 | 0.28 | 303 | 43 |
| Example 2 | 0.35 | 314 | 62 |
| Example 3 | 0.19 | 297 | 28 |
| Comparative Example 1 | 0.43 | 327 | 538 |
| Comparative Example 2 | 0 | 252 | 17 |

The solid electrolytic capacitor in each of Examples 1 to 3 had large electrostatic capacity and low leakage current. The solid electrolytic capacitor of Comparative Example 1 with a large third region had large electrostatic capacity but was also increased in leakage current. The solid electrolytic capacitor in Comparative Example 2 with no third region had low leakage current but showed a small value in electrostatic capacity.

The present disclosure can be utilized for a solid electrolytic capacitor including a porous sintered body as an anode body.

What is claimed is:

1. A solid electrolytic capacitor comprising a capacitor element that includes an anode body being a porous sintered body having a hexahedral shape, an anode lead, a dielectric layer formed on the anode body, and a solid electrolyte layer formed on the dielectric layer, wherein:

one end of the anode lead is embedded into the anode body from a first surface of the anode body, the anode body has a second surface and a third surface which are opposite to each other and are respectively sharing one side with the first surface, the anode body having a first region that includes the second surface, a second region that includes the third surface, and a third region interposed between the first region and the second region, the third region has lower density than each of the first region and the second region, an average thickness T3 of the third region in a first direction extending from the second surface to the third surface and a thickness TL of the anode lead in the first direction satisfy a relationship T3<TL, a surface of the anode lead is in contact with at least one of the first region and the second region, and a Vickers hardness of each of the first region and the second region is 1.1 times or more a Vickers hardness of the third region.

2. The solid electrolytic capacitor according to claim 1, wherein the average thickness T3 and an average thickness T of the anode body in the first direction satisfy a relationship 0.15<T3/T<0.4.

3. The solid electrolytic capacitor according to claim 1, wherein the thickness TL and the average thickness T satisfy a relationship TL/T≤0.8.

4. The solid electrolytic capacitor according to claim 1, wherein a surface of the anode lead is in contact with both the first region and the second region.

5. The solid electrolytic capacitor according to claim 1, wherein a CV value of the anode body is 100 kCV/g or more.

6. The solid electrolytic capacitor according to claim 1, wherein an area of each of the second surface and the third surface is larger than an area of each of a fourth surface and a fifth surface, the fourth surface and the fifth surface being opposite to each other and each sharing one side with the first surface.

7. The solid electrolytic capacitor according to claim 1, wherein a Vickers hardness of the third region ranges from 1 to 100, inclusive.

8. A solid electrolytic capacitor comprising a capacitor element that includes an anode body being a porous sintered body having a hexahedral shape, an anode lead, a dielectric layer formed on the anode body, and a solid electrolyte layer formed on the dielectric layer, wherein:

one end of the anode lead is embedded into the anode body from a first surface of the anode body, the anode body has a second surface and a third surface which are opposite to each other and are respectively sharing one side with the first surface, the anode body having a first region that includes the second surface, a second region that includes the third surface, and a third region interposed between the first region and the second region, a Vickers hardness of each of the first region and the second region is 1.1 times or more a Vickers hardness of the third region, an average thickness T3 of the third region in a first direction extending from the second surface to the third surface and a thickness TL of the anode lead in the first direction satisfy a relationship T3<TL, and a surface of the anode lead is in contact with at least one of the first region and the second region.

9. The solid electrolytic capacitor according to claim 8, wherein a CV value of the anode body is 100 kCV/g or more.

10. The solid electrolytic capacitor according to claim 8, wherein a Vickers hardness of the third region ranges from 1 to 100, inclusive.

11. The solid electrolytic capacitor according to claim 8, wherein the average thickness T3 and an average thickness T of the anode body in the first direction satisfy a relationship 0.15<T3/T<0.4.

12. The solid electrolytic capacitor according to claim 8, wherein the thickness TL and the average thickness T satisfy a relationship TL/T≤0.8.

13. The solid electrolytic capacitor according to claim 8, wherein a surface of the anode lead is in contact with both the first region and the second region.

* * * * *